Patented June 8, 1943

2,321,048

UNITED STATES PATENT OFFICE 2,321,048

OPALESCENT SYNTHETIC RESINS

Calvin E. Schildknecht, Bloomfield, N. J., assignor to E. I. du Pont de Nemours & Company, Wilmington, Del., a corporation of Delaware No Drawing. Application September 12, 1941, Serial No. 410,631

6 Claims. (Cl. 260—42)

This invention relates to opalescent synthetic resins and, more particularly, to securing opalescent effects in methyl methacrylate resins without the use of conventional pigments or effect materials.

An object of the present invention is to prepare a synthetic resin having methyl methacrylate as its major constituent and characterized by brilliant opalescence. A further object of the invention is to provide such opalescent resin in forms adapted to commercial use, particularly in the forms of massive castings and of molding compounds. A still further object of the invention is to achieve these effects and results without the use of conventional coloring materials or effect materials. Other objects will be apparent from the description of the invention given hereinafter.

The above objects are accomplished according to the present invention by subjecting to polymerizing conditions a mixture comprising, per 100 parts by weight of said mixture, 50-70 parts of a sub-mixture of which from 100% to 95% is methyl methacrylate polymer, and from 0% to 5% is a polymer from the group consisting of vinyl acetate polymer and n-butyl methacrylate polymer 25-45 parts of styrene monomer, and 3-8 parts of a second monomer from the group consisting of methyl methacrylate, methyl acrylate, vinyl acetate, and n-butyl methacrylate monomers, until its monomeric constituent is substantially completely polymerized. The opalescent resin thus obtained in massive form may be comminuted for use as a molding compound or may be mixed with other methyl methacrylate resins, for example, by hot rolling, and the resulting mixture, preferably comminuted, used as a molding compound.

It is not necessary that a second polymer be used with the methyl methacrylate polymer although the methyl methacrylate polymer may be replaced with up to 5.0% of either vinyl acetate polymer or n-butyl methacrylate polymer. In the preferred composition of the present invention, methyl methacrylate monomer is used along with the styrene monomer but the methyl methacrylate monomer may be partially or completely replaced by methyl acrylate, vinyl acetate, or n-butyl methacrylate.

The polymeric material is used in a state of subdivision, preferably finely enough divided so as to pass a 60-mesh screen, and is mixed with the monomeric constituents to form a slurry. This slurry, if poured immediately into a mold, would be subject to settling of the particles of polymer. Accordingly, it is stirred until sufficient of the polymer has dissolved in the monomer to increase the viscosity of the slurry to about 1 to 100 poises, stirring for about 15 minutes at 30° C. usually being sufficient for this purpose. The mixture is then poured into a mold and no appreciable settling of the solid particles of polymer occurs.

If it is desired that the final polymeric resin be as nearly homogeneous as possible, the mixture is allowed to stand in the mold, under conditions which cause substantially no polymerization, in order to effect a substantial homogenization of the mixture by diffusion. This will ordinarily require several days at refrigeration temperature (5–10° C.), or a few hours at room temperature.

The polymerization of the monomeric constituent of the mixture may be effected by known means. It may be necessary, however, that the temperature of the mass undergoing polymerization be not allowed to rise too far because this can result in an undesirable opacification. There is no sharp line of demarcation at which this undesirable opacification will occur, but it can normally be avoided by not allowing the temperature adjacent to the polymerizing mass to exceed about 100° C., a temperature above which it is not usual to polymerize if a flawless resin is desired.

Methods suitable for effecting the polymerization of the monomeric components of such a slurry, to yield the polymerized opalescent resin in massive form in useful shapes, and on a commercial scale, will include those of United States Patents Nos. 2,057,674, 2,057,673, 2,136,422, 2,136,423 and 2,136,424 for rods and that disclosed in application of R. T. Fields Serial No. 294,049, filed September 9, 1939, for tubes. It is to be noted, also, that the process of the present invention comprises certain features in common with that disclosed in application of Maurice L. Macht and John G. Stansbury, Serial No. 410,652, filed concurrently with the present application.

Instead of a slurry, the monomeric and polymeric ingredients may be mixed to form a dough, but the viscosity of such a dough will be so high that it cannot be poured and hence cannot feasibly be introduced into molds for polymerization by the technique of casting. Such a dough can, however, be molded in the manner disclosed in United States Patent No. 2,101,107, e. g., introduced in proper quantity into a compression mold and therein subjected to pressure, whereby it is shaped, and to heat, whereby the monomeric constituents are polymerized.

The polymeric products are resins characterized by a distinct and attractive opalescence. By transmitted light the resins are not more than slightly hazy, and of a tint ranging from reddish to yellowish orange. By reflected light they appear bluish or violet, and somewhat milky. This dependence of appearance upon the manner of illumination forms the basis of attractive and unique visual effects obtainable by variously shaping the material, carving or etching it, and the like.

The intensity of the opalescent colors and of the slight haziness which accompanies them, is roughly proportional to the percentage of styrene in the composition and thus is controllable by selection of the proper amount of this ingredient. It will ordinarily be desirable to use less of this ingredient in masses of thick section than in masses of thin section.

If it be desired to utilize the massive opalescent resins of the invention for the manufacture of articles by compression- or injection-molding, two alternatives are available. The massive polymer may be comminuted into fragments small enough to constitute a manageable molding powder but this method is not preferred because the molecular weight of resin made by the technique of casting is likely to be too high for entirely satisfactory performance in a molding powder. It is preferred to blend the opalescent polymer of the invention with ordinary clear polymer or copolymer of methyl methacrylate having a low molecular weight, e. g. 15,000 to 25,000 determined by the method of Staudinger in chloroform solution. This blending may be done on heated mixing rolls and can be made to yield a substantially homogeneous mixture having an average viscosity sufficiently low to be moldable without difficulty and exhibiting an opalescence, less marked than that of its opalescent resinous component by itself, but still attractive and useful.

It is feasible to mix fragments of the opalescent cast resin of the invention with more readily moldable molding compounds and from such a mixture to produce molded articles in which the fragments of opalescent resin will be individually visible. If the opalescent resin of the invention is used in this way, obviously the molding compound with which the fragments of it are mixed, is not necessarily one in which polymethyl methacrylate preponderates, but may be any molding compound capable of flowing around and anchoring the fragments of opalescent resin.

The following examples illustrate specific embodiments of the invention, all proportions being given by weight.

*Example 1*

For the preparation of a sheet of dimensions 18×18×0.375 inch, the following ingredients are used

|  | Grams | Per cent |
|---|---|---|
| Styrene monomer | 847.5 | 37.5 |
| Methyl methacrylate monomer | 113 | 5.0 |
| Methyl methacrylate polymer | 1,299.5 | 57.5 |
|  | 2,260.0 | 100.0 |

The methyl methacrylate polymer contains benzoyl peroxide, approximately 0.6 per cent by weight, as a residue of that used in its polymerization.

The two monomers, both essentially dry and free from inhibitor and from polymer, are mixed together and to this mixture is added, with stirring, the methyl methacrylate polymer, which is finely divided enough to pass a 60-mesh screen. The stirring is continued for thirty minutes and results in swelling of the particles of polymer and solution of polymer in monomer to such a degree that the viscosity of the liquid phase is considerably increased. When stirring is discontinued, the particles of polymer do not settle.

This mixture is poured into a cell comprising a glass plate in horizontal position supporting a peripheral gasket of rubber wrapped in "Cellophane." When this cell has been filled, a second glass plate is placed over it, and rests upon the gasket. The filled cell, still in horizontal position, is placed in an autoclave, where it is subjected to a temperature of 77° C. and a pressure of 90 pounds per square inch for five hours, which bring about the polymerization of the monomeric constituents of the mixture. The upper glass plate adheres to the contents of the cell during the polymerization, and the shrinkage in volume of the mass during polymerization causes the upper plate to move correspondingly closer to the lower plate against the yielding resistance of the rubber gasket. Upon the completion of the polymerization, the cell and contents are allowed to cool, and the sheet of polymer is then removed from the cell.

By transmitted light this sheet of resin exhibits a delicate orange tinge, and is substantially transparent. By reflected light it exhibits a bluish or violet tinge and a slightly milky appearance.

*Example 2*

The following ingredients are used for the preparation of a sheet of dimensions 18×18×0.75 inch:

|  | Grams | Per cent |
|---|---|---|
| Styrene monomer | 1,385 | 35.0 |
| Methyl methacrylate monomer | 198 | 5.0 |
| Methyl methacrylate polymer | 2,378 | 60.0 |
|  | 3,961 | 100.0 |

The procedure is the same as in Example 1, except that the temperature applied during the polymerization is 71° C. A sheet of similar characteristics is obtained.

*Example 3*

For the preparation of tube of outside diameter 3 inches, wall thickness $\tfrac{5}{8}$ inch and length 20 inches, the following ingredients are used:

|  | Grams | Per cent |
|---|---|---|
| Styrene monomer | 480 | 40 |
| Methyl methacrylate monomer | 60 | 5 |
| Methyl methacrylate polymer | 660 | 55 |
|  | 1,200 | 100 |

These ingredients are mixed as in Example 1, but stirred only for about 15 minutes at room temperature, whereby the viscosity of the liquid phase is increased only to about 1 poise.

The mixture is introduced into a cylindrical mold of inside diameter 3 inches and length 20 inches, which is then rotated for three hours at room temperature, at 100 R. P. M. The rotation causes the mixture to assume the shape of a tube against the cylindrical wall of the mold, and the period of rotation at a temperature insufficiently high to effect appreciable polymerization permits of the substantial homogenization of the mixture by diffusion. Thereafter the mold and contents, while still being rotated, are heated at a temperature of 60 to 66° C. for seven hours. During this period of heating, the monomeric constituents of the mixture are substantially completely polymerized. The mold and its contents are then chilled, and a tubular mass of opalescent resin is removed from the mold.

Because of its larger content of styrene, this material is more pronouncedly milky than that of the preceding examples.

Example 4

For the production of rods of 1.625 inches diameter, a mixture is made of

|  | Per cent |
|---|---|
| Styrene monomer | 37.5 |
| Methyl acrylate monomer | 5.0 |
| Methyl methacrylate polymer | 57.5 |
|  | 100.0 |

As in the previous examples, the methyl methacrylate polymer contains a residue of catalyst of polymerization which serves to accelerate the polymerization of the monomeric constituents of this mixture.

The mixture is introduced into a tube of inside diameter 1.625 inches, closed at the bottom, and therein is subjected to a pressure of 150 pounds per square inch, supplied, conveniently, by compressed nitrogen gas. The mold is immersed vertically downward, at a rate of 2 inches per hour, into a bath of hot water at 88° C. Substantially complete polymerization of the monomeric constituents of the mixture is thereby brought about, from the bottom of the mold upward, and a flawless rod of opalescent resin is formed. This is recovered from the mold by chilling mold and contents, whereby the rod is loosened in the mold.

Example 5

The procedure of the preceding example is applied to a mixture of—

|  | Per cent |
|---|---|
| Styrene monomer | 30 |
| n-Butyl methacrylate monomer | 6 |
| Methyl methacrylate polymer | 64 |
|  | 100 |

Example 6

In place of the cell described in Example 1, there is provided a cell comprising two steel plates fitted with a peripheral gasket in the manner of Example 1. Recessed in these plates are semi-cylindrical cavities. The cavities in the lower and upper plates are in register with each other, so that as the two plates approach each other the combination of the upper and lower cavities approaches the shape of a cylindrical cavity. The procedure of Example 1 is followed with this cell. The polymerized mass removed from the cell comprises approximately cylindrical masses connected by thin webs corresponding to the space finally remaining between the steel plates. These approximately cylindrical masses are separated from each other by breaking the web, and are readily turned down to accurate cylindrical shape.

Example 7

A mixture is made of the following ingredients:

|  | Grams | Per cent |
|---|---|---|
| Styrene monomer | 35 | 35.0 |
| Vinyl acetate monomer | 5 | 5.0 |
| Methyl methacrylate polymer | 60 | 60.0 |
| Benzoyl peroxide | 0.1 | 0.1 |

The benzoyl peroxide is dissolved in the mixture of monomer before the finely-divided polymer is stirred in. The mixture is stirred until it has thickened to a viscosity of about 50 poises, and is then introduced into a glass bottle of inside diameter 2 inches. This is now placed in an autoclave and subjected to a pressure of 10 pounds per square inch (provided by compressed nitrogen), and a temperature of 76° C., for five hours. The resin is recovered by breaking the glass bottle.

Example 8

The procedure of the preceding example is applied to a mixture of

|  | Grams | Per cent |
|---|---|---|
| Styrene monomer | 35 | 35.0 |
| Methyl methacrylate monomer | 5 | 5.0 |
| Methyl methacrylate polymer | 57 | 57.0 |
| Vinyl acetate polymer | 3 | 3.0 |
| Benzoyl peroxide | 0.1 | 0.1 |

Example 9

The same procedure is applied to a mixture of

|  | Grams | Per cent |
|---|---|---|
| Styrene monomer | 28 | 28.0 |
| Vinyl acetate monomer | 6 | 6.0 |
| Methyl methacrylate polymer | 63 | 63.0 |
| n-Butyl methacrylate polymer | 3 | 3.0 |
| Benzoyl peroxide | 0.1 | 0.1 |

Example 10

Other mixtures suitable for use by methods similar to the specific methods of the preceding examples will include those listed below. It is to be understood that the viscosity of the mixture as introduced into the mold must be selected with reference to the requirements of the process and conditions selected for the polymerization, and that the viscosity is practicably controllable by interrupting at an appropriate point the increase in viscosity of the liquid phase which results from contact of the liquid monomer with the solid polymer. After the mixture has been introduced into the mold, it will normally be desirable to promote the homogeneity of the mixture by providing a period of storage, at a temperature too low to promote polymerization, during which period diffusion may proceed to the desired extent.

|  |  | Per cent |
|---|---|---|
| (a) | Styrene monomer | 26 |
|  | Methyl methacrylate monomer | 8 |
|  | Methyl methacrylate polymer | 66 |
|  | Catalyst | 0.4 |
| (b) | Styrene monomer | 43.0 |
|  | Methyl methacrylate monomer | 5.0 |
|  | Methyl methacrylate polymer | 52.0 |
|  | Catalyst | 0.3 |
| (c) | Styrene monomer | 40.0 |
|  | Methyl methacrylate monomer | 3.0 |
|  | Methyl methacrylate polymer | 57.0 |
|  | Catalyst | 0.2 |
| (d) | Styrene monomer | 40.0 |
|  | Methyl methacrylate monomer | 3.0 |
|  | Methyl acrylate monomer | 3.0 |
|  | Methyl methacrylate polymer | 54.0 |
|  | Catalyst | 0.35 |
| (e) | Styrene monomer | 28.0 |
|  | Vinyl acetate monomer | 3.0 |
|  | Methyl methacrylate polymer | 69.0 |
|  | Catalyst | 0.5 |

Example 11

To 450 parts of a copolymer of methyl methacrylate (90) and styrene (10), of molecular weight approximately 25,000, rolling as a soft mass on mixing rolls at 150° C. is added 95 parts of the opalescent resin of Example 1, broken into small fragments. In about 20 minutes of further rolling, the resulting mixture has become substantially homogeneous. It is taken from the rolls as a thin slab, cooled, and comminuted. The resulting molding powder is injection-molded at about 255° C. and yields molded articles of opalescent character, less marked than that of the resin of Example 1, but definite and attractive.

It will be understood that conventional auxiliary ingredients, such as plasticizers and lubricants, may be added, for conventional purposes, to the ethenoid ingredients required by the invention, except when their presence in the initial ethenoid mixture may be found, upon trial, to interfere with the development of opalescence.

Also it is permissible to introduce very small amounts of suitable dyestuffs, for the purpose of modifying the hue of the resin, but not in such quantity as would obscure the characteristic opalescence developed in accordance with the invention.

The invention provides resins of unique opalescent character and a process whereby they may be made economically on a commercial scale. None of the conventional "effect materials" is required, nor will any dyestuff be used except for modifying the tints of the opalescence achieved in their absence.

The resins, in either cast or moldable form, serve as materials for jewelry and decoration, household articles, architectural and illuminating accessories, automobile hardware, novelties, and the like.

As many apparently widely different embodiments of this invention may be made without departing from the spirit and scope thereof, it is to be understood that the invention is not limited to the specific embodiments thereof except as defined in the appended claims.

I claim:

1. An opalescent resin resulting from the polymerization of a mixture comprising, per 100 parts by weight, 50-70 parts of a polymer component essentially consisting of methyl methacrylate polymer, 25-45 parts of styrene monomer, and 3-8 parts of a second monomer from the group consisting of methyl methacrylate, methyl acrylate, vinyl acetate, and n-butyl methacrylate monomers.

2. An opalescent resin resulting from the polymerization of a mixture comprising, per 100 parts by weight, 50-70 parts of methyl methacrylate polymer, 25-45 parts of styrene monomer, and 3-8 parts of methyl methacrylate monomer.

3. Process of preparing an opalescent resin which comprises subjecting to polymerizing conditions a mixture comprising, per 100 parts by weight, 50-70 parts of a polymer component essentially consisting of methyl methacrylate polymer, 25-45 parts of styrene monomer, and 3-8 parts of a second monomer from the group consisting of methyl methacrylate, methyl acrylate, vinyl acetate, and n-butyl methacrylate monomers, until its monomeric constituent is substantially polymerized.

4. Process of preparing an opalescent resin which comprises subjecting to polymerizing conditions a mixture comprising, per 100 parts by weight, 50-70 parts of methyl methacrylate polymer, 25-45 parts of styrene monomer, and 3-8 parts of methyl methacrylate monomer, until its monomeric constituent is substantially polymerized.

5. Process of preparing an opalescent cast resin which comprises introducing into a mold a mixture comprising, per 100 parts by weight, 50-70 parts of a finely divided methyl methacrylate polymer, 25-45 parts of styrene monomer, and 3-8 parts of a second monomer from the group consisting of methyl methacrylate, methyl acrylate, vinyl acetate, and n-butyl methacrylate monomers, said mixture having a viscosity between 1 and 100 poises, maintaining said mixture in said mold under non-polymerizing conditions until it has become substantially homogenized, and then subjecting said mixture in said mold to polymerizing conditions at a temperature not exceeding 100° C. until its monomeric constituent is substantially completely polymerized.

6. Process of preparing an opalescent cast resin which comprises introducing into a mold a mixture comprising, per 100 parts by weight, 50-70 parts of solid particles of methyl methacrylate polymer, said particles passing a 60-mesh screen, 25-45 parts of styrene monomer, and 3-8 parts of methyl methacrylate monomer, said mixture having a viscosity between 1 and 100 poises, maintaining said mixture in said mold under non-polymerizing conditions until it has become substantially homogenized, and then subjecting said mixture in said mold to polymerizing conditions at a temperature not exceeding 100° C. until its monomeric constituent is substantially completely polymerized.

CALVIN E. SCHILDKNECHT.